(12) United States Patent
Nusser

(10) Patent No.: US 6,372,893 B1
(45) Date of Patent: Apr. 16, 2002

(54) AZO DYESTUFFS

(75) Inventor: Rainer Nusser, Neuenburg (DE)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 09/702,632

(22) Filed: Oct. 31, 2000

(30) Foreign Application Priority Data

Nov. 1, 1999 (CH) ................................. 1995/99

(51) Int. Cl.[7] ...................... C09B 62/51; C09B 62/513; D06P 1/384
(52) U.S. Cl. ...................... 534/634; 534/635; 534/638; 8/549; 106/31.48
(58) Field of Search ................................. 534/634, 635, 534/638; 8/549; 106/31.48

(56) References Cited

U.S. PATENT DOCUMENTS

| | | | |
|---|---|---|---|
| 5,175,262 A | 12/1992 | Loeffler et al. | 534/634 |
| 5,292,870 A | 3/1994 | Anderton | 534/638 |
| 5,304,221 A | 4/1994 | Schwarz et al. | 8/549 |
| 5,556,435 A | * 9/1996 | Russ et al. | 8/549 |
| 5,559,215 A | 9/1996 | Dannheim et al. | 534/573 |
| 5,597,902 A | * 1/1997 | Bootz et al. | 534/622 |
| 5,831,038 A | 11/1998 | Reichert | 534/612 |
| 5,925,746 A | 7/1999 | Lauk et al. | 534/634 |
| 6,015,439 A | * 1/2000 | Pedemonte et al. | 8/549 |

FOREIGN PATENT DOCUMENTS

| | | |
|---|---|---|
| EP | 0 516 298 | 12/1992 |
| EP | 630946 | * 12/1994 |
| EP | 0 733 679 | 9/1996 |
| JP | 07-324172 | * 12/1995 |

OTHER PUBLICATIONS

PCT Search Report, Feb. 9, 2001.
Derwent Patent Family Abstract for EP 0 733 679, Sep. 25, 1996.

* cited by examiner

*Primary Examiner*—Fiona T. Powers
(74) *Attorney, Agent, or Firm*—Andrew F. Sayko, Jr.; Scott E. Hanf

(57) ABSTRACT

Claimed are novel azo dyes of the formula (I)

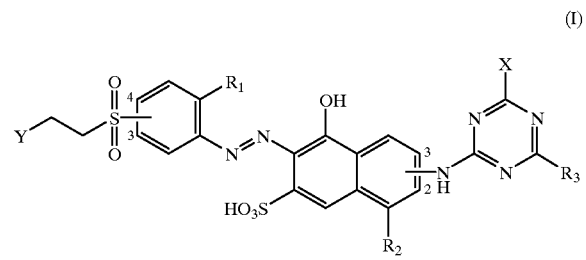

where the substituents are each as defined in the claims, their preparation, their use as dyes and as an ingredient of an ink-jet printing ink and also substrates dyed with such compounds.

10 Claims, No Drawings

AZO DYESTUFFS

FIELD OF THE INVENTION

This invention relates to novel azo dyes use as dyes, as an ingredient of an ink-jet printing ink and also substrates dyed with such compounds.

SUMMARY OF THE INVENTION

This invention relates to novel azo dyes of the formula (I)

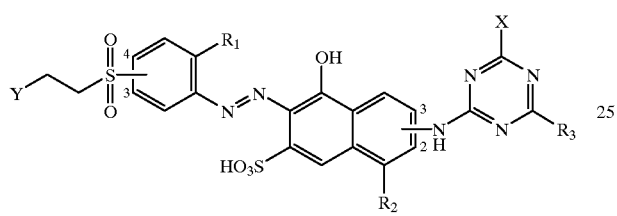

(I)

where the substituents are each as defined below, their preparation, their use as dyes and as an ingredient of an ink-jet printing ink and also substrates dyed with such compounds.

DESCRIPTION OF THE PREFERRED EMBODIMENTS

This invention relates to novel azo dyes of the formula (I)

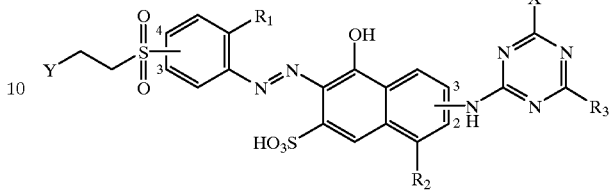

(I)

where
$R_1$ and $R_2$ are independently H or —$SO_3H$,
X is a halogen atom, especially F or Cl,
Y is an alkali-detachable group, especially —$OSO_3H$, Cl, Br, —$OPO_3H_2$, —$SSO_3H$, —$OCOCH_3$, —$OCOC_6H_5$ or —$OSO_2CH_3$
$R_3$ is —$NR_4R_5$, where $R_4$ and $R_5$ are independently hydrogen, a linear or branched $C_{1-10}$-alkyl group which may additionally be interrupted by one or more identical or different heteroatoms or functional groups, especially by —O— and/or —$SO_2$—, and which may optionally be substituted; a phenyl group, which may optionally be substituted by one or more identical or different radicals, especially by $C_{1-4}$-alkyl, preferably —$CH_3$, —$SO_3H$ or —$SO_2$—$CH_2CH_2$—Y, where Y is as defined above, or $R_4$ and $R_5$ may combine with the nitrogen to which they are bonded to form a $C_3$–$C_8$ ring which may additionally contain one or more identical or different heteroatoms, especially O, S or N, preferably additionally an N or an O,
subject to the proviso that when $R_4$ or $R_5$ is an —$SO_2CH_2CH_2OSO_3H$-substituted phenyl group, $R_1$ is always —$SO_3H$,
or $R_3$ has the formula (Ia)

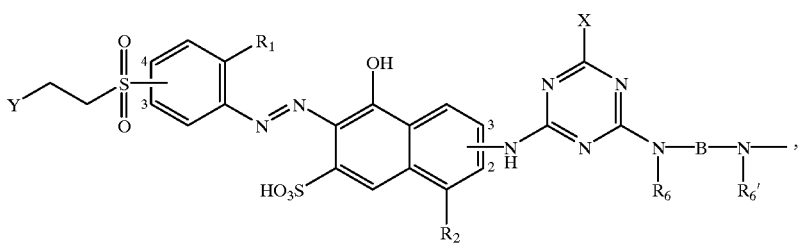

(Ia)

where
X, Y, $R_1$ and $R_2$ are each as defined in the formula (I),
$R_6$ and $R_6'$ are independently H or a linear or branched $C_{1-6}$-alkyl group, preferably a linear $C_{1-4}$-alkyl group, and B is a phenylene group or a linear or branched $C_{1-10}$-alkylene group, which may optionally be substituted, subject to the proviso that the position of the —NH— group on the naphthyl ring and the position of the —$SO_2(CH_2)_2$—Y group on the phenyl ring are identical to those of the formula (I), and also mixtures thereof and their salts.

Useful cations for salt formation include in particular alkali metal or alkaline earth metal cations.

In preferred compounds of the formula (I), $R_3$ is —$NR_4R_5$, where $R_4$ and $R_5$ are independently H, unsubstituted or HO—, HOOC—, $HO_3S$—, $HO_3SO$— or halogen-substituted —$CH_3$ and —$CH_2CH_3$, linear $C_{4-6}$-alkyl groups which are interrupted by —O— and/or $SO_2$— and which are additionally substituted by Y having the abovementioned meanings, preferably Cl or —$OSO_3H$; or monosubstituted phenyl groups, substituted in particular by —$CH_3$, —$SO_3H$ or —$SO_2CH_2CH_2Y$, where Y is as defined above, preferably —$OSO_3H$, although in the latter case the abovementioned proviso again applies that $R_1$ is always —$SO_3H$.

In likewise preferred compounds of the formula (I), $R_3$ has the formula (Ia) where $R_6$ and $R_6'$ are independently H, —$CH_3$ or —$CH_2CH_3$, B is a linear or branched $C_{2-6}$-alkylene group or a phenylene group and X is F.

In particularly preferred compounds of the formula (I), $R_3$ is —$NR_4R_5$, where $NR_4R_5$ is $NHCH_3$, —$NHCH_2CH_3$, —$N(CH_3)_2$, —$N(CH_2CH_3)_2$, —$NHCH_2COOH$, —$NHCH_2CH_2OH$, $NHCH_2CH_2SO_3H$, —$NHCH_2CH_2OSO_3H$, —$N(CH_3)CH_2CH_2OH$, $NHCH_2CH_2SO_2CH_2CH_2OSO_3H$, —$NHCH_2CH_2CH_2SO_2CH_2CH_2OSO_3H$, $NHCH_2CH_2OCH_2CH_2SO_2CH_2CH_2Cl$,

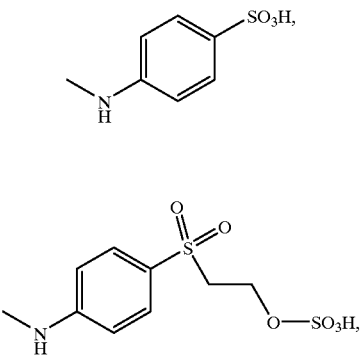

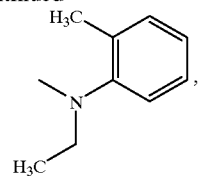

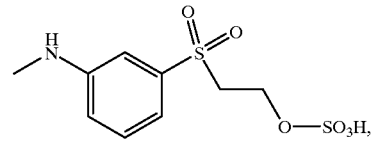

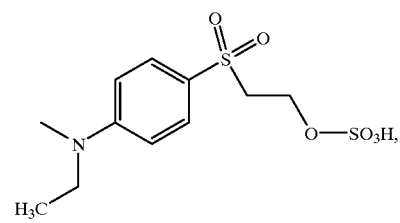

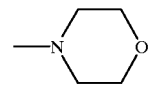

and Y is —$OSO_3H$.

In particularly preferred compounds of the formula I, $R_3$ has the formula (Ia) where $R_6$ and $R_6'$ are hydrogen, B is —$CH_2CH_2$—, —$CH(CH_3)CH_2$—, —abd T us —$OSO_3H$.

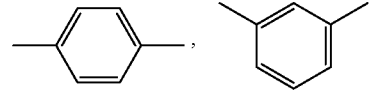

and Y is —$OSO_3H$.

In a likewise particularly preferred compound of the formula (I), $R_3$ has the formula (Ia) where $R_6$ is —$CH_3$ and $R_6'$ is H, while B is —$CH_2CH_2$— and Y is —$OSO_3H$.

A likewise particularly preferred compound has the formula (Ib)

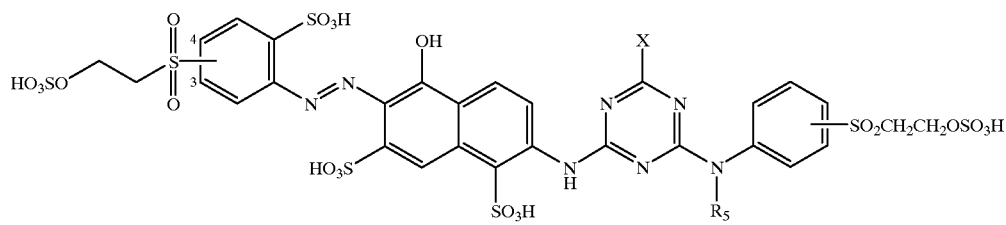

(Ib)

where $R_5$ is H or a substituted or unsubstituted $C_{1-4}$-alkyl group and X is Cl or F.

A further aspect of the present invention is the synthesis of the compounds according to the invention, which comprises coupling a compound of the formula

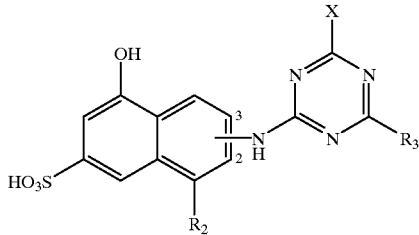

(II)

with the diazo compound of an amine of the formula (III)

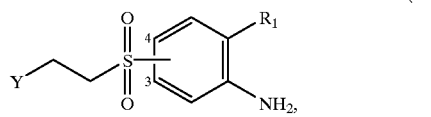

(III)

where the substituents in the formula (II) and the substituents in the formula (III) are each as defined above, under generally known conditions.

This coupling takes place at a pH of 5–8, preferably 6–7. The reaction temperature is between 0 and 40° C., preferably between 10 and 30° C., particularly preferably between 20 and 30° C. The compounds according to the invention are isolated and aftertreated according to known methods.

The compounds of the formula (I) and mixtures thereof and their salts are reactive dyes; they are useful for dyeing or printing hydroxyl-containing or nitrogenous organic substrates.

Another aspect of the invention is accordingly a process for dyeing or printing hydroxyl-containing or nitrogenous organic substrates, which comprises dyeing or printing with the above-defined compounds, their salts or mixtures.

Preferred substrates are leather and fiber materials comprising natural or synthetic polyamides and especially natural or regenerated cellulose, such as cotton, filament viscose or staple viscose. The most preferred substrate is textile material comprising cotton.

Another aspect of the present invention is the use of the above-defined compounds, their salts or mixtures for dyeing or printing the above-described substrates.

The compounds of the formula (I) can be used in dyeing liquors or in print pastes according to all dyeing or printing methods customary for reactive dyes.

Preferably they are dyed up by the exhaust method in the temperature range of 40 to 100° C.

The compounds of the invention can be used as individual dyes or else, because of their excellent compatibility, as combination elements with other reactive dyes of the same class possessing comparable dyeing properties, for example their general fastnesses, their exhaustion and fixation value, etc. The combination dyeings obtained have similar fastnesses to the dyeings with the individual dye.

The compounds of the formula (I) provide good exhaustion and fixation values. The unfixed dye portion is readily washed off. The dyeings and prints obtained possess good lightfastness. They also have good wetfastness properties.

The present invention also provides a hydroxyl-containing or nitrogenous organic substrate, especially cellulose, polyamides and animal fibers, preferably cotton or cotton-containing substrates, dyed or printed by the above-described dyeing or printing processes.

Also claimed is the use of the compound of the formula (I) or mixtures thereof or their salts as a component in an ink-jet printing ink.

The examples hereinbelow serve to illustrate the invention.

Percentages and parts are by weight, unless otherwise stated. Temperatures are reported in degrees Celsius.

EXAMPLES

Example 1

23.9 parts of 2-amino-8-hydroxynaphthalene-6-sulphonic acid are dissolved at 25° C. in 400 parts of water under neutral conditions and the solution is cooled with 300 parts of ice to 0–5° C. At this temperature 13.5 parts of 2,4,6-trifluorotriazine are added dropwise while the pH is maintained at 4.0–4.5 by metered addition of a 15% sodium carbonate solution. After subsequent stirring for about 5 min. 8.7 parts of morpholine are added, while the pH is maintained at 7.5–8.0 by metered addition of 15% sodium carbonate solution. Stirring is then continued at 10° C. until the reaction has ended. This provides a suspension of the reaction product of the formula (IV)

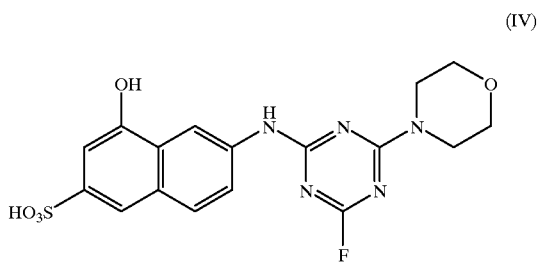

(IV)

This suspension is admixed with a diazonium salt solution prepared in conventional manner from 28.1 parts of 4-aminophenyl 2'-sulphatoethyl sulphone and 25 parts by volume of 4 N sodium nitrite solution at 0–5° C. while the pH is maintained at 6.5–7.0 by metered addition of 15% sodium carbonate solution. After the coupling has ended, the resulting dye of the formula (V)

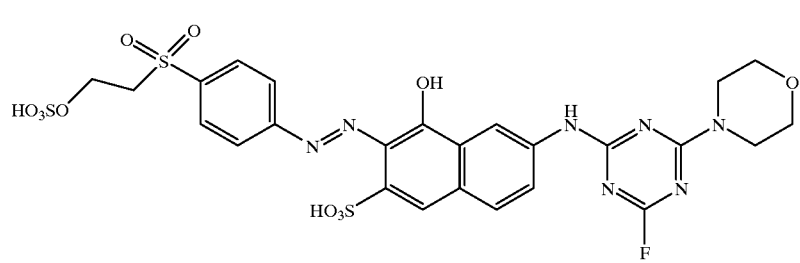

(V)

is salted out with sodium chloride, filtered off and dried at 50° C. under reduced pressure. On cellulose material and especially on cotton it provides red dyeings having very good fastness properties and good stability to oxidative effects.

Examples 2–43

Tables 1 and 2 comprise dyes preparable from appropriate starting materials by the method described in Example 1. On cotton these dyes provide red or orange dyeings and prints having very good light- and wetfastnesses and are stable to oxidative effects.

TABLE 1

Examples 2 to 34

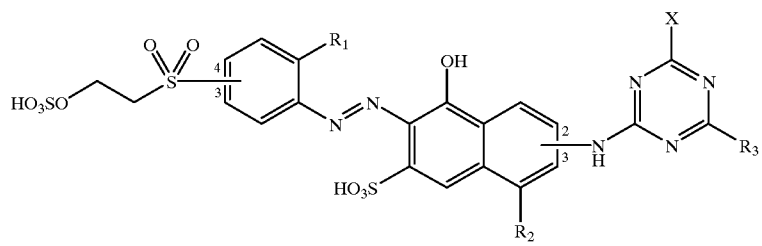

| Ex. | Pos. —SO$_2$CH$_2$CH$_2$OSO$_3$H | Pos. —NH— | X | R$_1$ | R$_2$ | R$_3$ | Hue |
|---|---|---|---|---|---|---|---|
| 2 | 3 | 2 | F | H | H | 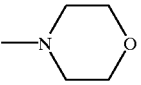 —N(morpholine) | red |
| 3 | 4 | 3 | F | H | H | " | orange |
| 4 | 3 | 3 | F | H | H | " | orange |
| 5 | 4 | 2 | F | H | H | —NHCH$_2$CH$_2$OH | red |
| 6 | 4 | 2 | F | H | H | —NHCH$_3$ | red |
| 7 | 4 | 2 | F | H | H | —NHCH$_2$CH$_3$ | red |
| 8 | 4 | 2 | F | H | H | —N(CH$_3$)$_2$ | red |
| 9 | 4 | 2 | F | H | H | —N(CH$_2$CH$_3$)$_2$ | red |
| 10 | 4 | 2 | F | H | H | —NHCH$_2$COOH | red |
| 11 | 4 | 2 | F | H | H | —NHCH$_2$CH$_2$SO$_3$H | red |
| 12 | 4 | 2 | F | H | H | —NHCH$_2$CH$_2$OSO$_3$H | red |
| 13 | 4 | 2 | F | H | H | —NHCH$_2$CH$_2$SO$_2$CH$_2$CH$_2$OSO$_3$H | red |
| 14 | 4 | 2 | F | H | H | —NHCH$_2$CH$_2$CH$_2$SO$_2$CH$_2$CH$_2$OSO$_3$H | red |
| 15 | 4 | 2 | F | H | H | —NHCH$_2$CH$_2$OCH$_2$CH$_2$SO$_2$CH$_2$CH$_2$Cl | red |
| 16 | 4 | 2 | F | H | H | —N(CH$_3$)CH$_2$CH$_2$OH | red |
| 17 | 4 | 2 | F | H | H | 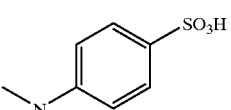 (4-SO$_3$H-C$_6$H$_4$-NH-CH$_3$-) | red |
| 18 | 4 | 3 | Cl | —SO$_3$H | —SO$_3$H | 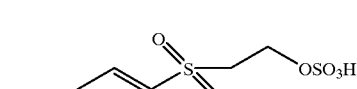 | orange |

TABLE 1-continued

Examples 2 to 34

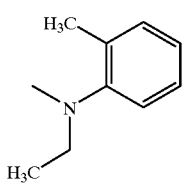

| Ex. | Pos. —SO$_2$CH$_2$ CH$_2$OSO$_3$H | Pos. —NH— | X | R$_1$ | R$_2$ | R$_3$ | Hue |
|---|---|---|---|---|---|---|---|
| 19 | 4 | 2 | F | H | H | 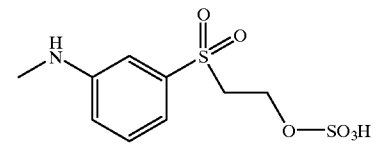 | red |
| 20 | 4 | 3 | F | —SO$_3$H | —SO$_3$H | 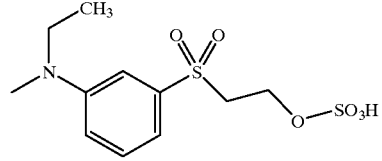 | red |
| 21 | 4 | 3 | Cl | —SO$_3$H | —SO$_3$H | 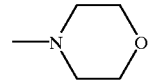 | orange |
| 22 | 4 | 3 | F | H | H | —NHCH$_2$CH$_2$SO$_2$CH$_2$CH$_2$OSO$_3$H | orange |
| 23 | 4 | 3 | F | H | H | —NHCH$_2$CH$_2$CH$_2$SO$_2$CH$_2$CH$_2$OSO$_3$H | orange |
| 24 | 4 | 3 | F | H | H | —NHCH$_2$CH$_2$OCH$_2$CH$_2$SO$_2$CH$_2$CH$_2$Cl | orange |
| 25 | 4 | 3 | F | H | H | —NHCH$_2$CH$_2$SO$_3$H | orange |
| 26 | 4 | 2 | F | -SO$_3$H | H | 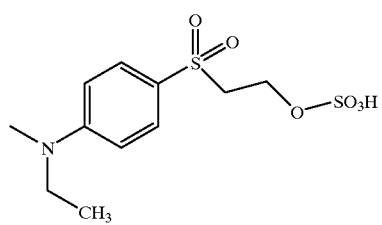 | red |
| 27 | 4 | 2 | Cl | H | H | —NHCH$_2$CH$_2$SO$_2$CH$_2$CH$_2$OSO | red |
| 28 | 4 | 3 | Cl | —SO$_3$H | —SO$_3$H |  | orange |
| 29 | 4 | 3 | Cl | —SO$_3$H | —SO$_3$H | " | orange |
| 30 | 3 | 3 | Cl | —SO$_3$H | —SO$_3$H | " | orange |

TABLE 1-continued

Examples 2 to 34

[Structure: naphthalene-based azo dye with sulfophenyl vinyl sulfone group and triazine substituent bearing X and R₃ groups, with R₁, R₂, OH, and $HO_3S$ substituents]

| Ex. | Pos. $-SO_2CH_2$ $-CH_2OSO_3H$ | Pos. $-NH-$ | X | $R_1$ | $R_2$ | $R_3$ | Hue |
|---|---|---|---|---|---|---|---|
| 31 | 4 | 3 | Cl | $-SO_3H$ | $-SO_3H$ | [m-($HO_3SO-CH_2CH_2-SO_2$)-phenyl-NH-CH_3] | orange |
| 32 | 3 | 3 | Cl | $-SO_3H$ | $-SO_3H$ | " | orange |
| 33 | 4 | 3 | F | H | $-SO_3H$ | $NHCH_2CH_2CH_2SO_2CH_2CH_2OSO_3H$ | orange |
| 34 | 4 | 2 | Cl | H | $-SO_3H$ | " | red |

TABLE 2

Examples 35–43

[Structure: bis-dye with bridging group W connecting two triazinyl-naphthalene azo dye units, each bearing fluoro-triazine]

| Ex. | Pos. $-SO_2CH_2CH_2OSO_3H$ | Pos. $-NH-$ | $R_1$ | W | Hue |
|---|---|---|---|---|---|
| 35 | 4 | 2 | H | $-NHCH_2CH_2NH-$ | red |
| 36 | 4 | 2 | $-SO_3H$ | " | red |
| 37 | 3 | 3 | H | $-NHC(CH_3)CH_2NH-$ | orange |
| 38 | 4 | 2 | H | " | red |
| 39 | 4 | 3 | H | $-NHCH_2C(CH_3)CH_2$ $CH_2CH_2NH-$ | orange |
| 40 | 4 | 3 | H | $-N(CH_3)CH_2CH_2CH_2NH-$ | orange |
| 41 | 4 | 3 | H | [1,4-bis(methylamino)phenylene] | orange |
| 42 | 3 | 2 | H | " | red |
| 43 | 4 | 3 | H | [1,3-bis(methylamino)phenylene] | orange |

Application Example A 0.3 part of the dye of the formula (V) of Example 1 is dissolved in 100 parts of demineralized water and 8 parts of Glauber salt (calcined) are added. The dyebath is heated to 50° C. and 10 parts of woven cotton fabric (bleached) are added. The temperature is maintained at 50° C. during the addition of sodium carbonate. The dyebath is then heated to 60° C. and the dyeing is continued at 60° C. for one hour.

The dyed fabric is then rinsed for 3 minutes with running cold water and then for 3 minutes with running hot water. The dyed fabric is then washed in boiling hot demineralized water for 15 minutes in the presence of 0.25 part of Marseilles soap. After another 3 minute rinse with running hot water and a subsequent centrifugation, the dyed fabric is dried at 70° C. in a drying cabinet. The result is a red dyeing having very good light- and wetfastnesses, which is stable to oxidative effects.

Application Example B

The dyebath, which contains 100 parts of demineralized water and 5 parts of Glauber salt, is entered with 10 parts of woven cotton fabric (bleached). The bath is heated to 50° C. over 10 minutes and then 0.5 part of the dye of the formula (V) of Example 1 is added. After a further 30 minutes at 50° C. 1 part of sodium carbonate (calcined) is added. The dyebath is then heated to 60° C. and the dyeing is continued at 60° C. for a further 45 minutes. The dyed fabric is rinsed first with running cold water and then with hot water and then washed as in Application Example A. The result is a red dyeing having very good light- and wetfastnesses, which is stable to oxidative effects.

The method of Application Examples A and B may also be applied to the other examples of Tables 1 and 2 or mixtures thereof and/or their salts. The result in each case is a red or orange dyeing having very good light- and wetfastnesses, which is stable to oxidative influences.

Application Example C

A print paste consisting of

| | |
|---|---|
| 40 parts | of the dye of formula (V) of Example 1 |
| 100 parts | of urea |
| 350 parts | of water |
| 500 parts | of 4% sodium alginate thickener and |
| 10 parts | of sodium carbonate |
| 1000 parts | in total | is applied to woven cotton fabric by known methods. The printed fabric is dried and fixed in steam at 102–104° C. for 4–8 minutes.

It is then rinsed first with cold water then with hot water. It is subsequently washed in boiling water as described in Application Example A and then dried. The result is a red dyeing having very good light- and wetfastnesses, which is stable to oxidative effects.

The method of Application Example C may also be applied to the other examples of Tables 1 and 2 or mixtures thereof and/or their salts. The result in each case is a red or orange dyeing having very good light- and wetfastnesses, which is stable to oxidative influences.

Application Example D 2.5 parts of the dye of Example 1 of the formula (V) are stirred at 25° C. into a mixture of 20 parts of diethylene glycol and 77.5 parts of water. The result is a printing ink which is suitable for the inkjet printing process. The method of Application Example D may also be applied to the other examples of Tables 1 and 2 or mixtures thereof and/or their salts.

What is claimed is:

1. A compound of the formula (I)

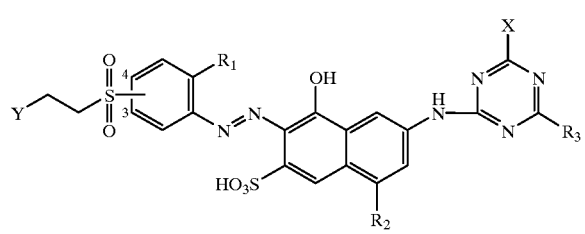

(I)

where $R_1$ and $R_2$ are independently —H or —$SO_3H$, subject to the proviso that at least one of $R_1$ and $R_2$ must be —$SO_3H$, X is a halogen atom, Y is an alkali-detachable group, $R_3$ is —$NR_4R_5$, where $R_4$ and $R_5$ are independently hydrogen; a linear or branched $C_{1-10}$ alkyl group; a phenyl group, which may optionally be substituted by one or more identical or different radicals;

or $R_4$ and $R_5$ may combine with the nitrogen to which they are bonded to form a $C_3$–$C_8$ ring which may additionally contain one or more identical or different heteroatoms, subject to the proviso that when $R_4$ or $R_5$ is an —$SO_2CH_2CH_2OSO_3H$ substituted phenyl group, $R_1$ is always —$SO_3H$, or a mixture thereof or its salt.

2. A compound according to claim 1, wherein $R_3$ has the formula (Ia)

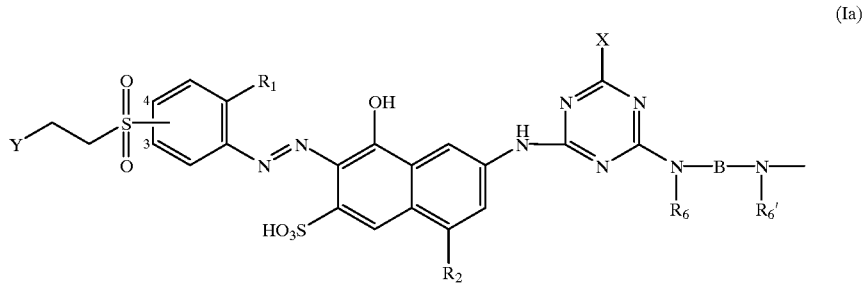

(Ia)

where
- X, Y, R₁ and R₂ are each as defined in formula (I) in claim 1,
- R₆ and R₆' are independently —H or a linear or branched $C_{1-6}$ alkyl group, and
- B is a phenylene group or a linear or branched $C_{1-10}$ alkylene group, which may optionally be substituted,
- subject to the proviso that the position of the —NH group on the naphthyl ring and the position of the —SO₂(CH₂)₂—Y group on the phenyl ring are both identical to those of formula (I) in claim 1, or a mixture thereof or its salt.

3. A compound according to claim 1, wherein both R₁ and R₂ are —SO₃H, R₃ is

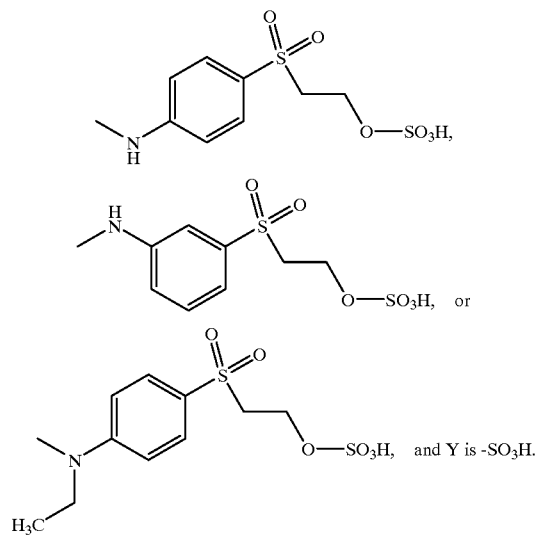

4. A compound of the formula (I)

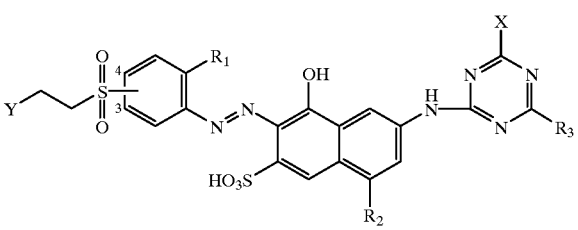

(I)

where

R₁ and R₂ are independently —H or —SO₃H

X is a halogen atom,

Y is an alkali-detachable group,

R₃ is —NR₄R₅,
where R₄ and R₅ are independently hydrogen or a linear or branched $C_{1-10}$ alkyl group; where R₄ and R₅ combine with the nitrogen to which they are bonded to form a $C_3$–$C_8$ ring which may additionally contain one or more identical or different heteroatoms, or a mixture thereof or its salt.

5. A compound according to claim 4, wherein R₃ has the formula (Ia)

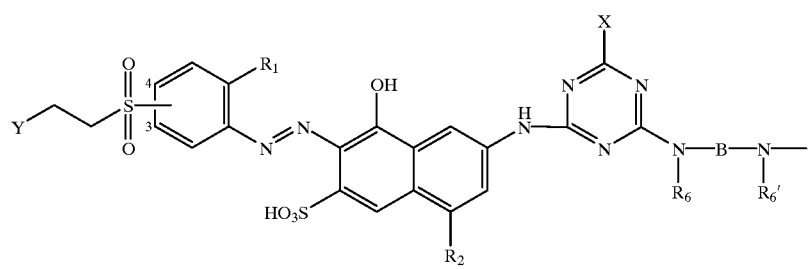

(Ia)

where
- X, Y, R₁ and R₂ are each as defined in formula (I) in claim 4,
- R₆ and R₆' are independently —H or a linear or branched $C_{1-6}$ alkyl group, and
- B is a phenylene group or a linear or branched $C_{1-10}$ alkylene group, which may optionally be substituted,
- subject to the proviso that the position of the —NH— group on the naphthyl ring and the position of the —SO₂(CH₂)₂—Y group on the phenyl ring are both identical to those of formula (I) in claim 4, or a mixture thereof or its salt.

6. A compound according to claim 4, wherein both $R_1$ and $R_2$ are —H and $R_3$ is

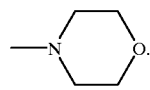

7. A compound according to claim 1 or 4, wherein
X is —F or —Cl,
Y is —OSO$_3$H, —Cl, —Br, —OPO$_3$H$_2$, —SSO$_3$H, —OCOCH$_3$, —OCOC$_6$H$_5$ or —OSO$_2$CH$_3$,
Useful cations for salt formation include in particular alkali metal or alkaline earth metal cations.
$R_3$ is —NR$_4$R$_5$,
where $R_4$ and $R_5$ are independently —H; unsubstituted —CH$_3$ or —CH$_2$CH$_3$;
or a mixture thereof or its salt.

8. A compound according to claim 2 or 5, wherein $R_3$ has the formula (Ia) where
$R_6$ and $R_6'$ are independently —H, —CH$_3$ or —CH$_2$CH$_3$,
B is a linear or branched $C_{2-6}$ alkylene group or a phenylene group and
X is —F,
or a mixture thereof or its salt.

9. A compound according to claim 2 or 5, wherein $R_6$ and $R_6'$ are hydrogen, B is —CH$_2$CH$_2$—, —CH(CH$_3$)CH$_2$—, —CH$_2$CH(CH$_3$)CH$_2$—, —CH$_2$CH(CH$_3$)CH$_2$CH$_2$CH$_2$—,

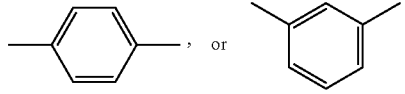

and

Y is —OSO$_3$H, or a mixture thereof or its salt.

10. A process for preparing a compound according to any of claims 1–9, wherein a diazo compound of an amine of the formula (II)

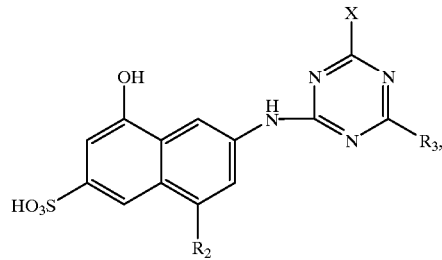

where the substituents are each as defined in claim 1 or 4, is coupled with a compound of the formula (III)

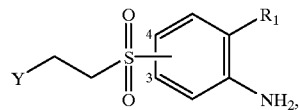

where the substituents are each as defined in claim 1 or 4.

* * * * *